UNITED STATES PATENT OFFICE.

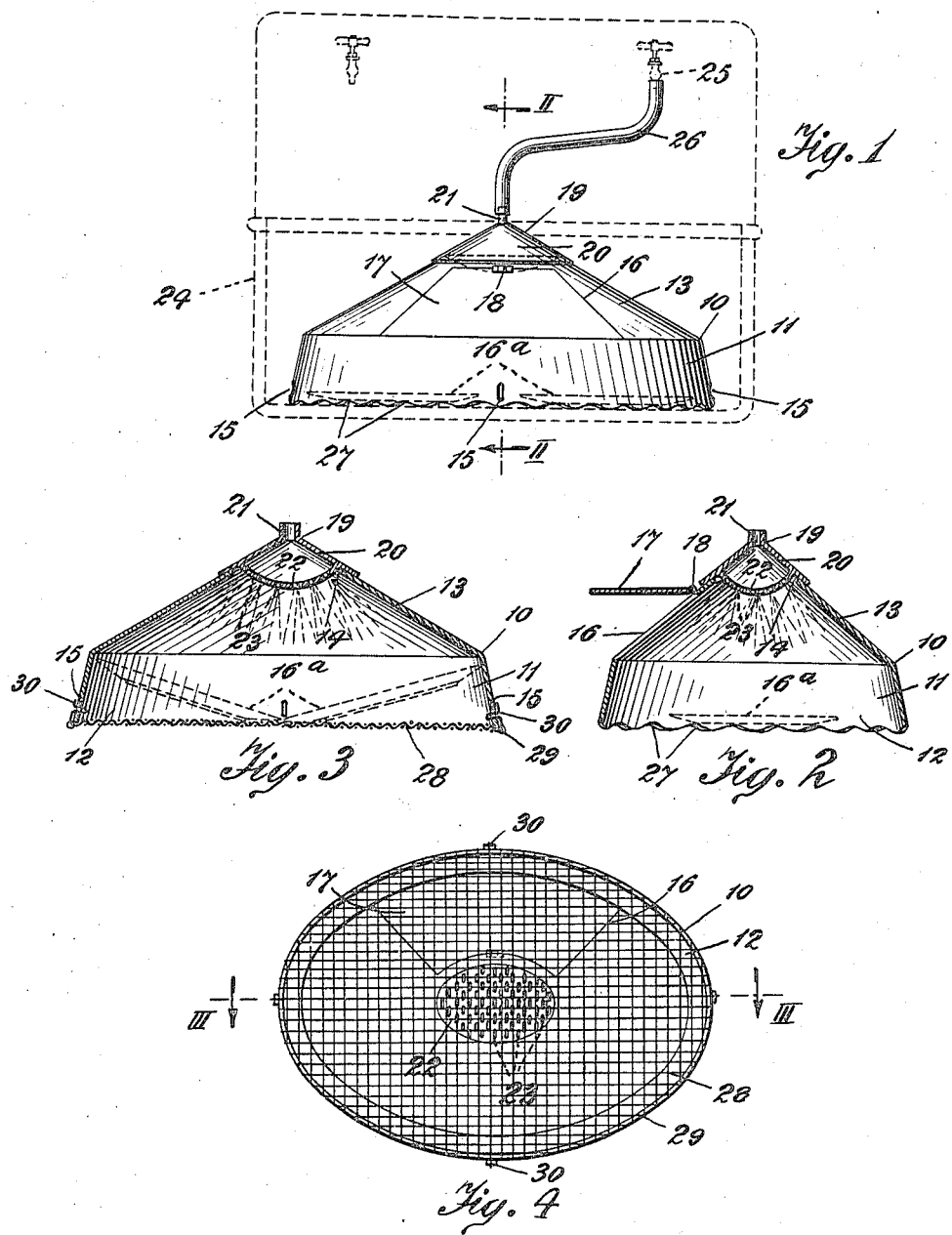

ARNALDO M. ABRAMO, OF NEW YORK, N. Y.

DISH-WASHING APPLIANCE.

1,193,495.  Specification of Letters Patent.  Patented Aug. 8, 1916.

Application filed March 30, 1915. Serial No. 18,033.

*To all whom it may concern:*

Be it known that I, ARNALDO M. ABRAMO, a subject of the King of Italy, and a resident of New York, county and State of New York, have invented a certain new and useful Improvement in Dish-Washing Appliances, of which the following is a full, clear, and exact specification.

This invention relates to a class of household articles.

My invention has for its object primarily to provide an appliance designed to be utilized in a manner whereby dishes, glassware, cutlery, and like articles when soiled may be easily washed, and wherein is provided a hollow casing, or receptacle having an open lower end, adapted to be placed in the sink, or tank into which hot water may flow through a faucet. In the wall of the receptacle is a lid controlled opening, through which the soiled articles are admitted into the receptacle, and in the upper part of the wall of the receptacle is a perforated hollow distributer, or head having an inlet for receiving hot water from the faucet for distribution in the form of a shower on the articles within the receptacle, thus permitting dishes, and the like to be quickly and effectually washed without requiring the work to be done by hand as is incident to the methods ordinarily employed in households.

Other objects of the invention are to provide a separate intersticed bottom for the lower open end of the receptacle; to provide means for detachably fastening the bottom to the receptacle; and to provide on the perforated distributer a tubular member adapted to be connected to the faucet for the water to flow therefrom to and through the distributer.

A further object of the invention is to provide a washing appliance of simple, durable, and efficient construction, and which is susceptible of being made in various shapes and sizes.

A practical embodiment of the invention is represented in the accompanying drawing forming a part of this specification in which similar characters of reference indicate corresponding parts in all the views, the said invention being more fully described hereinafter, and then pointed out in the claim at the end of the description.

In the drawing, Figure 1 is an elevation of one form of dish washing appliance embodying my invention, showing the manner of its use in conjunction with the sink, or tank of a hot water supply. Fig. 2 is a section taken on the line II—II of Fig. 1. Fig. 3 is a section taken on the line III—III of Fig. 4, and Fig. 4 is an inverted plan of the appliance with its intersticed bottom applied to the receptacle thereof.

The dish washing appliance has a hollow casing, or receptacle 10 having preferably an oval body 11 with an outwardly diverging annular wall to provide an open bottom 12, and on the top of the wall is a tapered, or substantially cone-shaped top portion 13, though this receptacle may be of any other desired shape. The apex of the top portion 13 is cut-out to provide an opening 14, and in the wall of the body 11 adjacent to its lower edge are a number of spaced holes, as 15. Through part of the top portion 13 of the receptacle is an opening 16 of sufficient size to permit dishes, glassware, and the other articles 16ᵃ to be washed to be passed therethrough into the receptacle, and this opening is closed by a lid, as 17, which is hinged, at 18, to the top portion so that the lid may be swung to open and closed positions thereon.

To permit the articles when placed in the receptacle to be washed, in the opening 14 of the apex of the top portion 13 of the receptacle is a hollow water distributer, or head 19 having a cone-shaped top plate 20 of a diameter so as to overlap the adjoining edges of the top portion of the receptacle for closing the opening 14 in entirety. This cone-shaped top plate of the water distributer 19 may be soldered, or otherwise secured to the top portion 13 of the receptacle, and projecting upwardly from the apex of the distributer is a short tube, or nipple 21 the passage through which leads into the interior of the distributer. The distributer 19 has a concaved plate 22 on the underside of its top plate 20, and this concaved plate is spaced from the pipe 21 to provide the hollow interior of the distributer. Through the concaved plate 22 are a number of spaced perforations 23 which may be of any desired shapes and sizes to distribute water in the form of a shower, or needle sprays upon the articles in the receptacle.

In practice the receptacle is positioned so that the lower edge of the wall of its body will be disposed in the sink, or tank, as 24, for receiving especially hot water from the faucet, as 25, of a suitable source of supply, and serving to convey the water from the faucet when open to the hollow perforated distributer 19. To the short tube 21 of the receptacle is connected one end of a tubular member, or pipe 26 having its other end connected to the nipple of the faucet. The pipe 26 may be made of rubber, or any other desired flexible material as well as being of any length whereby the receptacle may be placed in the sink, or tank at a suitable distance from the faucet, and as the water is delivered from the faucet it will flow through the pipe 26, through the tube 21, into the distributer 19, then through the perforations 23, for delivery in the form of a shower on the articles which have been previously placed in the receptacle. In this manner all foreign substances on the articles will be quickly washed therefrom, the pressure of the water thereon being greatly increased by forcing it through the small perforations of the distributer.

In order to permit the water delivered to the receptacle 10 to flow through its open bottom, the lower edge of the wall of its body 11 may be corrugated, as at 27, to provide passages, or instead of these corrugations an intersticed bottom, as 28, may be removably applied over the open end 12 of the receptacle. The bottom 28 may be made of interwoven spaced strands of metal wire, or like material held to a marginal band 29 which is of approximately the same diameter as the body 11 of the receptacle, and this bottom is detachably fastened to the receptacle by providing on the band 29 of the bottom a number of spaced hooks, as 30. All of the hooks 30 are held pivotally on the band so as to be swung in upwardly and downwardly directions, and the hooks are arranged so that each will engage one of the holes 15 when swung upwardly for connecting the intersticed bottom to the receptacle, or when these hooks are swung downwardly they will be withdrawn from the holes for detaching the intersticed bottom from the receptacle. In this form of the appliance when the soiled dishes, or other articles are placed in the receptacle, as above described, they will rest on the intersticed bottom, and the water received in the receptacle will be delivered on the dishes and will then flow through the interstices of the bottom.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claim.

Having thus described my invention, I claim as new and desire to secure by Letters Patent—

A dish washing appliance, comprising a casing substantially oval in cross-section and having a cone-like top portion with an opening in its apex and having an annular bottom portion with a corrugated lower edge, a sprinkler head mounted in the opening in the top portion, and having a tube extension providing means for connection with a hot water supply, an opening for obtaining access through one side of the casing, a closure therefor, and an intersticed bottom removably secured to the casing.

This specification signed and witnessed this twenty ninth day of March A. D. 1915.

ARNALDO M. ABRAMO.

Witnesses:
 ROBT. B. ABBOTT,
 M. DERMODY.